(12) United States Patent
Rantalainen

(10) Patent No.: US 7,009,635 B2
(45) Date of Patent: Mar. 7, 2006

(54) METHOD FOR MODIFYING A VISIBLE OBJECT SHOT WITH A TELEVISION CAMERA

(75) Inventor: Erkki Rantalainen, Ristiina (FI)

(73) Assignee: Virtual Advertising Systems VAS Ltd., Mikkeli (FI)

( * ) Notice: Subject to any disclaimer, the term of this patent is extended or adjusted under 35 U.S.C. 154(b) by 718 days.

(21) Appl. No.: 10/169,830

(22) PCT Filed: Jan. 30, 2001

(86) PCT No.: PCT/FI01/00088

§ 371 (c)(1),
(2), (4) Date: Jul. 10, 2002

(87) PCT Pub. No.: WO01/58147

PCT Pub. Date: Aug. 9, 2001

(65) Prior Publication Data

US 2003/0001954 A1    Jan. 2, 2003

(30) Foreign Application Priority Data

Jan. 31, 2000  (FI)  .................. 20000192
Apr. 11, 2000  (FI)  .................. 20000857

(51) Int. Cl.
*H04N 7/18* (2006.01)
(52) U.S. Cl. ............ 348/136; 348/137; 348/141; 348/143; 348/47; 382/175; 382/206

(58) Field of Classification Search ............... 348/136, 348/137, 141, 143, 47; 382/175, 206
See application file for complete search history.

(56) References Cited

U.S. PATENT DOCUMENTS 5,041,919 A * 8/1991 Yamamoto et al. .......... 358/449
5,844,603 A * 12/1998 Ogata ....................... 348/155

FOREIGN PATENT DOCUMENTS

WO       WO 97/02699       1/1997

* cited by examiner

Primary Examiner—Shawn S. An
(74) Attorney, Agent, or Firm—Young & Thompson

(57) ABSTRACT

A method for modifying a visible object shot with a television camera, in which method the object is marked by one or more marking surfaces disposed in the area of the object or in its vicinity, these marking surfaces being identifiable on the basis of radiation differing from other radiation in the area being shot. At least one of the marking surfaces differs in radiation from the environment on the basis of a property other than the color of visible light. The marking surface is identified using at least one identifying detector which is separate from the detectors of the television camera and by means of which the object is shot substantially from the same shooting direction as the picture shot by the television camera.

22 Claims, 2 Drawing Sheets

METHOD FOR MODIFYING A VISIBLE OBJECT SHOT WITH A TELEVISION CAMERA

Figure 1:
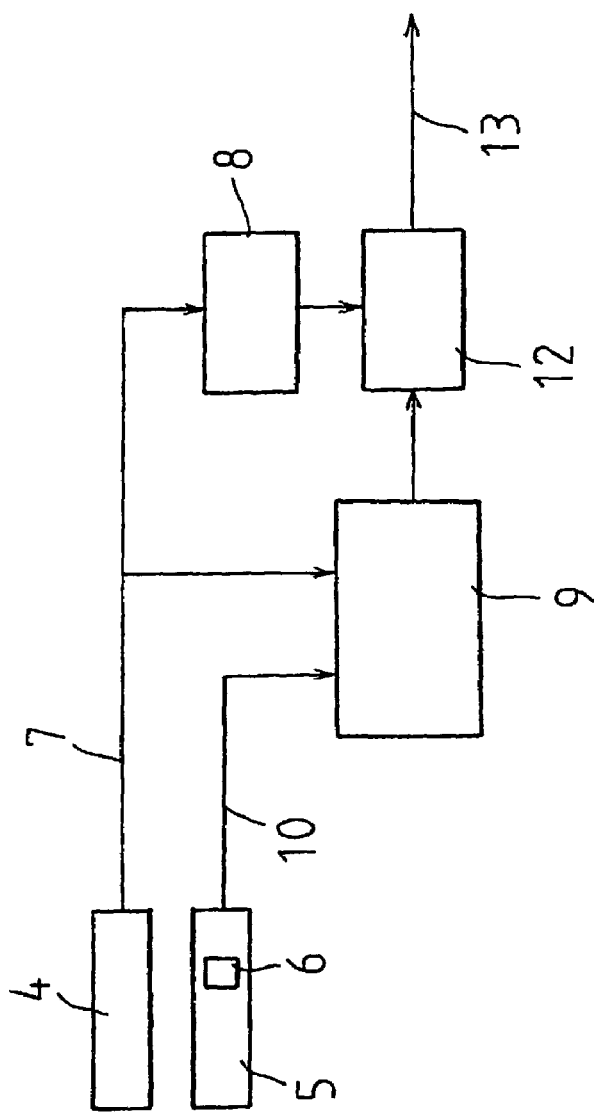

The present invention relates to a method for modifying a visible object shot with a television camera.

The method of the invention is intended for use especially in various sports competitions and similar public events where telecasting and advertisements on view at the occasion and effectively displayed on television constitute a significant part of the profitability of the arrangements as a whole.

At present, advertising is increasingly subject to national or regional restrictions. Alcohol or tobacco advertisements are forbidden in many countries. People in different countries have different attitudes toward advertising. A given advertisement may be very successful and effective in certain countries, whereas in a different cultural environment it may evoke displeasure or even be illegal.

Therefore, advertising becomes relatively neutral or even trivial, and certain public events cannot be telecast to some countries at all, only because illegal advertisements would be shown on television.

A further problem especially in large international broadcasts is that advertisements have an effect and are worth an investment by advertisers only if the products advertised are distributed globally. Therefore, advertising products available in a more limited market area in such broadcasts is not profitable.

Another source of problems in television broadcasts is the fast tempo of sports competitions, which is why especially in ball games the playing means, such as e.g. the puck, is difficult to discern in a television picture. This makes it more difficult to follow the sports event, thus having a reducing effect on the number of watchers of the event on television, which again has a definite economic significance for the organizers of the event.

The object of the invention is to eliminate the drawbacks referred to above. A specific object of the invention is to disclose a new type of method whereby a television picture can be modified in a desired manner in respect of both advertisements and fast moving objects seen in it, e.g. playing means.

As for the features characteristic of the invention, reference is made to the claims.

In the method of the invention, a visible object shot with a television camera is marked by means of one or more marking surfaces disposed in the area of the object or in its immediate vicinity, which surfaces can be identified on the basis of radiation differing from other radiation in the area being shot. At least one of these marking surfaces differs in radiation from the environment on the basis of a property other than the color of visible light. In the method, the marking surface is identified using at least one identifying detector which is separate from the detectors of the television camera and by means of which the object is shot substantially from the shooting direction of the television camera. By additionally determining the relationship between the picture coordinates of the television camera and those of the identifying detector, the areas visible in the television picture of the object can be determined by the aid of the marking surfaces detected. After this, the television picture video signal for the areas corresponding to the object is modified in a predetermined manner, whereupon the modified video signal is transmitted.

Thus, in the method of the invention, a visible object shot with a television camera can be modified by image processing techniques so that a desired area in the television picture, e.g. an advertisement visible in the picture, can be changed into a different advertisement. In the same way, if the object to be modified in the television picture is a relatively small and moving object, its visibility in the television picture can be improved by enhancing or altering the shades of color of the object in the television picture.

In the method of the invention, the areas visible in the television picture of the object are preferably defined by the aid of the locations and shapes of marking surfaces detected, by the aid of the relative positions of the marking surfaces and the object and by the aid of the relationship between the coordinates of the television camera and those of the identifying detector.

The marking surface used in the method of the invention reflects, passes or emits radiation differing from the radiation of the environment. Thus, the marking surface on the object or in its vicinity may consist of one or more films, surfaces or radiation sources reflecting, passing or emitting radiation that differs from the rest of the environment in respect of its properties, such as spectrum or polarization characteristics, so it is easy to detect. The radiation of the marking surface differs from the radiation of the environment e.g. in that it absorbs radiation having a given wavelength or given wavelengths in the infrared range.

If the picture is focused to the identifying detector by means of the same objective as to the television camera, then the relationship between the picture coordinates of the identifying detector and those of the television camera will remain constant when the camera is turned or when the shooting distance or zooming changes. Thus, a fixed correlation prevails between the coordinate system of the identifying detector and that of the television picture, and so the coordinates of the identifying detector are converted into coordinates of the television picture via a simple transfer function. On the other hand, if the identifying detector has a different objective than the television camera, then the relationship between the coordinate systems of the detectors depends on the properties of the objectives and their location relative to each other and their aiming and zooming.

If the objective lenses are about identical and located near each other and if they are moved together and zoomed in about the same way, then there will be but little variation in the relationship between the co-ordinate systems of the detectors, and an approximate value for the coordinates of the television picture can be obtained by using the detector coordinates. An approximate value can also be determined if the objectives are different or if they are not moved or zoomed in the same way, provided only that the position and zooming of the objectives and their effect on the coordinate systems are known.

Once the locations of the marking surfaces and the object in the television picture have been determined as approximate values, they can be defined more accurately as follows.

If there is in the object or in its vicinity one or more reference objects located in a known position with respect to the object and the marking surfaces and capable of being identified from the television picture on the basis of brightness, contrast, color or shape, then its/their position in the television picture will be established via a software-based location function. The image of the reference object can be modified before location to make it roughly consistent with the coordinates of the television picture. The location function is only performed in the vicinity of the approximate position.

If the picture and surroundings of the object change so that its not possible to use a predetermined reference object, then a model picture can be taken from the image obtained from the identifying detector or a detector associated with it and using the same objective, from the area or vicinity of the object or marking surface. The model picture is modified so as to make it approximately consistent with the coordinates of the television picture, and the location function is performed in the television picture only in the vicinity of the approximate position.

Once the positions of the marking surfaces in the television picture have been established, the location and other data regarding the object can be determined on the basis of the relative positions of the marking surfaces and the object.

In the method of the invention, depending on the objects to be identified and on their nature, i.e. on the radiation emitted by them, it is possible to use one or more beam splitters by means of which desired radiations are directed to one or more identifying detectors. In this way, radiation components having different properties can be directed by beam splitters to different detectors. In addition to or partly instead of them, it is also possible to use suitable filters.

In the method of the invention, the edges of the object and its visible areas in the television picture can be determined as described above by utilizing the following information as needed in each situation:

shape of the object relation of the location of the markers to the object properties of the radiation emitted by the object and/or markers properties and relative locations of the reference objects relative to the object which can be identified from the television picture visual obstructions identified on the basis of radiation emitted by the object coordinates of the radiation emitted by the object or markers in the image produced by the identifying detector position and zooming states of the objective of the television camera and of the objective of the identifying detector relationship between the coordinates of the television picture and those of the image produced by identifying detector exact or approximate location of the object or of the markers in the television picture, and location of the reference objects in the television picture.

In the method of the invention, it is possible to provide an advertisement with a code indicating which advertisement or advertising place is in question. The code may be any visible code or it may consist of a surface or surfaces differing from the surroundings in respect of radiation properties, which surface or surfaces is/are detected and interpreted by the identification system. The code specifies e.g. the picture to be used to replace the advertisement in question.

The entire area of the advertisement or a part of it may also be so treated that the radiation emitted by it will differ from other radiation so that it can be detected by a detecting device. On the basis of this, the system is able to determine which part of the object is visible and which part of it is hidden behind a visual obstruction. Enhancement or alteration of the picture is then only performed on that portion of the object which is visible. Thus, if only a part of an advertisement is visible, then the system will put in that place a corresponding part of a substitutive picture.

The method of the invention has significant advantages as compared with previously known technology. As the place of an object, such as e.g. an advertisement, is filled in the television picture with another picture, the same advertising space can be shared in respect of time and target localities between different advertisements or advertisers. The replacement picture may be a still or a moving picture and it may be obtained from a storage in the system or from another camera.

Pictures can be changed depending on events occurring in the television program or according to a predetermined schedule. For example, in a Formula 1 race, as the vehicles are racing dozens of times around the same track, tobacco or alcohol advertisements along the track are changed in the television picture into other advertisements in broadcasts to certain countries. In the same way, different advertisements can be shown in the same advertising space on different rounds.

Similarly, e.g. in ice hockey, especially when the exposure time used in the identifying detector is considerably shorter than the exposure time used in the television camera, the vague picture of the fast moving puck which is usually produced by the television camera can be substituted with a better focused and sharper picture of the puck, which may additionally be shown with an enhanced color or color intensity or as a flashing object to make it easier to follow.

Figure 2:
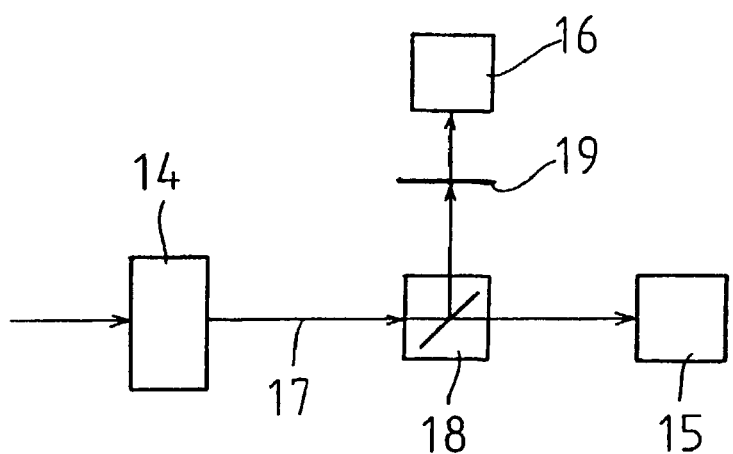
Figure 3:
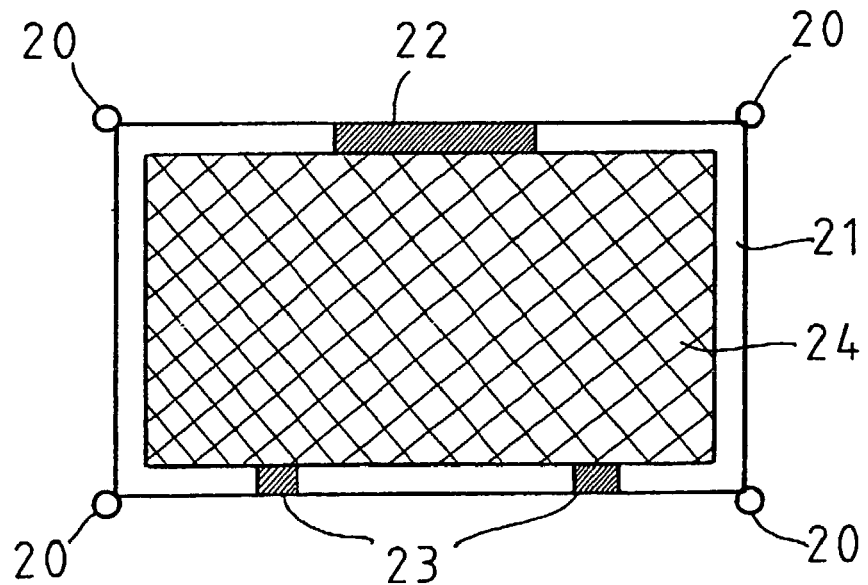

In the following, the invention will be described in detail with reference to the attached drawings, wherein FIG. 1 presents a diagram representing the method of the invention, FIG. 2 presents a diagram representing another embodiment of the method, and FIG. 3 is a diagram showing some structural alternatives regarding the object shot in the method.

In FIG. 1, the object 1 being shot is a fixed advertisement of a rectangular form, with a lamp 2 radiating infrared light placed behind it so that the radiation permeates the entire area of the advertisement. The surrounding illumination does not contain any significant infrared light component. Placed on the corners of the advertisement are blue lamps 3 emitting light toward the television camera 4.

An auxiliary camera 5 is provided with an identifying detector 6, which identifies infrared light at a short distance. The auxiliary camera is fixedly aimed at the advertisement 1. In addition, the auxiliary camera 5 and the television camera 4 use simultaneous exposure when shooting their pictures.

The signal 7 obtained from the television camera 4 is branched so that it goes both to a delay element 8 and to a computer 9. Connected to the computer 9 is also the signal 10 obtained from the auxiliary camera 5.

The computer system 9 compares the radiation values of the pixels of the auxiliary camera 5 to a given, e.g. predetermined reference limit and generates a mask picture indicating which part of the area of the advertisement 1 is not visible to the camera. In other words, the mask picture defines the area where there is a visual obstruction, such as e.g. a walking or standing person 11, between the advertisement 1 and the camera.

The computer system identifies the position and zooming of the television camera and, based on this information, is able to establish the approximate location of the advertisement 1 in the television picture. The precise locations of the corner points of the advertisement are determined by determining the locations of the blue lamps 3 on the basis of the brightness values of different color components of the pixels. Once the locations of the corner points of the advertisement 1 have been established, the area of the advertisement in the television picture is known. Moreover, based on the mask picture produced by the auxiliary camera 5, the areas within the picture area that are hidden behind a visual obstruction 11 are known.

The memory of the computer 9 may contain a stored picture to be used to replace an area in the advertisement. The substituting picture is modified so that it will fit into the area in the advertisement picture. At the same time, the locations of visual obstructions have been taken into account. Another possibility is that the substituting picture is taken into the computer from an external source, such as e.g. a television camera located in a suitable place and shooting the advertisement to be transferred.

During the time taken by the computer system to process the images from the auxiliary camera 5 and television camera 4, a copy of the picture taken by the television camera has been retained in the delay element 8. The modified substituting picture and the television camera picture kept waiting in the delay element are fed into a combiner 12, where the substituting picture is added to the original picture so that it replaces the visible areas of the advertisement. After this, the modified television picture is passed on to broadcasting 13.

FIG. 2 presents another embodiment of the invention, in which the picture is focused via the same objective 14 both to the detector 15 of a television camera and to an identifying detector 16. In this case, the radiation 17 passed through the objective 14 is branched in a beam splitter 18 to pass it to the detector 15 of the television camera and to the identifying detector 15. Before the identifying detector, additionally a filter 19 may be used to pass only a given type of radiation to the identifying detector. In this case, the relationship between the picture coordinates of the identifying detector and those of the television camera remains constant, allowing the coordinates of the identifying detector to be converted into television picture coordinates via a simple transfer function.

FIG. 3 illustrates various ways in which the advertisement area to be shot and modified can be marked. The figure shows a rectangular advertisement in which all corners are marked with reference objects 20, e.g. circles of a given color, by means of which the location of the object in the television picture can be accurately defined.

The entire advertisement surface may be surrounded by a frame 21, i.e. a marking surface differing in radiation from its environment on the basis of a property other than the color of visible light. Likewise, the frame may contain a separate code 22 which can be used to identify the advertising board in question. Moreover, the frame or other parts of the advertisement surface may be provided with location codes 23 which give a more accurate indication of the location in question in this object. A further possibility is to have the entire advertisement surface 24 coated with a film which is permeable to visible light but which still has the effect that the radiation from the surface differs from the radiation of the environment on the basis of polarization characteristics. As can be seen from the examples described above, the picture surface to be treated and modified can be marked or constructed in various ways. The essential point is only that the marking surface reflects, passes or emits radiation that differs from the radiation of the environment to such a degree that it can be accurately identified and located using suitable means.

In the foregoing, the invention has been described by way of example with reference to the attached drawings while different embodiments of the invention are possible in the scope of the inventive idea defined in the claims.

What is claimed is:

1. Method for modifying a visible object shot with a television camera, characterized in that the object is marked by means of one or more marking surfaces disposed in the area of the object or in its vicinity, said marking surfaces being identifiable on the basis of radiation differing from other radiation in the area being shot, at least one of said marking surfaces differing in radiation from the environment on the basis of a property other than the color of visible light, the marking surfaces, which are visible in the picture, are identified using at least one identifying detector which is separate from the detectors of the television camera and by means of which the object is shot substantially from the same shooting direction with the television camera, the location, shape and size of the areas of the object that are visible in the television picture are determined by the known relationship between the picture coordinates of the television camera and those of the identifying detector or detectors, the video signal of the television picture for the areas corresponding to the visible areas of the object is modified in a predetermined manner.

2. Method as defined in claim 1, characterized in that marking surfaces, which are visible in the picture, are identified using at least one identifying detector which is separate from the detectors of the television camera and by means of which the object is shot through the same lens as the television camera.

3. Method as defined in claim 1, characterized in that those areas of the object that are visible in the television picture are determined on the basis of the locations and shapes of marking surfaces detected, the relative position of the marking surfaces and the object, and the relationship between the coordinates of the television camera and those of the identifying detector.

4. Method as defined in claim 1, characterized in that the object to be modified and being shot is an advertisement, which is changed into a different advertisement.

5. Method as defined in claim 1, characterized in that the marking surface reflects, passes or emits radiation differing from the radiation of the environment.

6. Method as defined in claim 1, characterized in that the picture is focused to the identifying detector by means of the same objective as to the television camera, with the result that the relationship between the picture coordinates of the identifying detector and those of the television camera remain constant when the camera is turned or when the shooting distance or zooming changes.

7. Method as defined in claim 6, characterized in that the image is directed to one or more identifying detectors using at least one beam splitter placed between the objective of the television camera and the image detector.

8. Method as defined in claim 6, characterized in that radiation components having different properties are directed to different detectors by means of beam splitters.

9. Method as defined in claim 6, characterized in that radiations having different radiation properties are filtered with filters placed in front of the identifying detectors.

10. Method as defined in claim 1, characterized in that the picture is focused to the identifying detector by means of an objective separate from the television camera, in which case the relationship between the coordinates of the television picture and those of the identifying detector are obtained as approximate values based on data giving the position, focusing and zooming of the cameras, and the location of the object in the television picture is defined by finding in the television picture at least one reference object in the object or in its vicinity on the basis of contrast, brightness, color or shape.

11. Method as defined in claim 10, characterized in that the appearance of the reference object to be found in the television picture is known beforehand.

12. Method as defined in claim 10, characterized in that the reference object to be located in the television picture is taken from the image in the identifying detector or from the image in a detector to which the image is focused by the same objective as to the identifying detector.

13. Method as defined in claim 10, characterized in that the picture of a reference object is modified before the search to adapt it to the coordinates of the television picture.

14. Method as defined in claim 1, characterized in that transmission of the video signal shot with the television camera is delayed so as to allow the video signal for an area corresponding to the object to be modified before transmission.

15. Method as defined in claim 1, characterized in that data indicating the location of the object is stored.

16. Method as defined in claim 1, characterized in that the radiation of a marking surface differs from the radiation of the environment on the basis of polarization characteristics.

17. Method as defined in claim 1, characterized in that the radiation of a marking surface differs from the radiation of the environment in that it absorbs radiation having a given wavelength or given wavelengths in the infrared range.

18. Method as defined in claim 1, characterized in that the object is marked with a code identifying it.

19. Method as defined in claim 1, characterized in that the object area or its edges contain codes 23 indicating the location of the code in relation to the object.

20. Method as defined in claim 1, characterized in that the locations of the marking surface or surfaces in the image in the identifying detector are determined by comparing the brightness of pixels to adjacent pixels, by comparing the brightness of pixels to a stored reference picture, and/or by comparing the brightness of the pixels of different identifying detectors to each other.

21. Method as defined in claim 1, characterized in that the exposure time of the identifying detector is kept substantially shorter than the exposure time of the television camera.

22. Method for modifying a visible object shot with a television camera, in which the object is marked by means of a marking surface disposed in the area of the object, said marking surface being identifiable on the basis of radiation differing from other radiation in the area being shot, said marking surface differing in radiation from the environment on the basis of a property other than the color of visible light, the marking surface is identified using at least one identifying detector which is separate from the detectors of the television camera and by means of which the object is shot substantially from the same shooting direction with the television camera, the relationship between the picture coordinates of the television camera and those of the identifying detector is determined, the areas of the object that are visible in the television picture are determined by the marking surface detected, the video signal of the television picture for the areas corresponding to the object is modified in a predetermined manner, characterized in that the picture is focused to the identifying detector by means of the same objective as to the television camera, with the result that the relationship between the picture coordinates of the identifying detector and those of the television camera remain constant when the camera is turned or when the shooting distance or zooming changes and the object to be modified and being shot is a relatively small and moving object whose visibility in the television picture is improved by enhancing or altering the shades of color of the object in the television picture.

* * * * *

UNITED STATES PATENT AND TRADEMARK OFFICE
CERTIFICATE OF CORRECTION

PATENT NO. : 7,009,635 B2
APPLICATION NO. : 10/169830
DATED : March 7, 2006
INVENTOR(S) : Erkki Rantalainen It is certified that error appears in the above-identified patent and that said Letters Patent is hereby corrected as shown below:

<u>Title page,</u>
Item [30], should read:

-- (30)  Foreign Application Priority Data

Jan. 31, 2000   (FI) …………….. 20000192
Apr. 11, 2000   (FI) …………….. 20000857
June 20, 2000   (FI) …………….. 20001455
Aug. 22, 2000   (FI …………….. 20001848
Aug. 28, 2000   (FI) …………….. 20001887 --.

Signed and Sealed this

Fourth Day of July, 2006

JON W. DUDAS
*Director of the United States Patent and Trademark Office*